United States Patent Office 3,306,810
Patented Feb. 28, 1967

3,306,810
COMPOSITIONS CONTAINING METHYLENE BIS-THIOCYANATE, DISPERSANT AND A DIMETH-YLAMIDE AND PROCESSES OF INHIBITING MICROBIOLOGICAL DETERIORATION UTILIZING SAID COMPOSITION
Stanley J. Buckman and John D. Pera, both of Memphis, Tenn., assignors to Buckman Laboratories, Inc., Memphis, Tenn., a corporation of Tennessee
No Drawing. Filed June 8, 1964, Ser. No. 373,491
8 Claims. (Cl. 162—161)

This invention relates to compositions and processes useful in various industrial processes for the purpose of controlling the growth and reproduction of microorganisms. More particularly the present invention relates to the use of a solution containing methylene bisthiocyanate to inhibit the growth of fungi and bacteria in industrial processes and products.

Many industrial products, both during the process of manufacture and as the finished product, are normally susceptible to fungal and bacterial degradation if means are not taken to inhibit such degradation. Wood pulp, starch and proteinaceous substances, animal hides, vegetable tanning liquors, and leather are all damaged or degraded by the growth of fungi, bacteria, and other microorganisms or by enzymes produced by such growth. Growth of microorganisms in industrial water supplies, for example, in reservoirs or basins, spray ponds or heat exchangers, or in cooling towers may produce slime or other solid accumulations which may interfere with the normal flow of the water or produce plugging or complete stoppage of the flow through pipes. In the case of heat exchangers such growths reduce the rate of heat transfer. Wet pulp containing more than about 30 percent moisture content is subject to attack by stain, mold, and decay fungi and is a fertile substrate for the growth of bacteria. If not controlled the result is a loss of useful fiber in badly decayed pulp, difficulty in dispersing partially decayed pulp, a darkening in color, and the development of undesirable odors caused by the growth of the microorganisms. As another example, microorganisms frequently grow in liquid alum systems to the extent that pipe lines become plugged. Sulfate-reducing bacteria which are generally present in waters used for the secondary recovery of petroleum are objectionable if not controlled. These microorganisms are able to reduce sulfates present in the injection water to sulfides which in turn react with soluble iron salts to form insoluble iron sulfide. As a result, matted deposits are produced consisting of sulfides, occluded oil, plus any other solids that may be present. Obviously this is undesirable because water containing such deposits when injected into subterranean formations causes plugging thereof. Furthermore sulfate-reducing bacteria cause corrosion of metal by accelerating galvanic action. Different species of bacteria, yeast and mold are encountered at various stages in the manufacture of leather. As an example, soaking provides an environment highly conducive to the growth of microorganisms, and even strong pickle solutions are subject to attack by some microorganisms; molds in particular, may be troublesome and cause discoloration of the pickled stock, especially if it is held for a period of time. During the chrome tanning process, the chrome tanned stock held "in the blue" readily molds and is discolored. Mold growth may develop on heavy vegetable tan leather during the drying period and produce spots and stains on either the flesh or grain sides.

Various microbiological agents have been suggested for use in the control of the microorganisms listed above including fungi and bacteria. While these suggested agents have certain advantages, when employed for a particular purpose and for a specific microorganism the results have not been entirely satisfactory. As, for example, the organic mercury compounds are very effective when employed against certain specific bacteria but are expensive and toxic; consequently great care must be exercised in their use. As another example, chlorine is an effective microbicide but is also very corrosive to many metals. Organic thiocyanates have long been used as insecticides (Donald E. H. Frear, "Chemistry of the Pesticides," Third Edition, D. Van Nostrand Company, Inc., New York, N.Y., 1955) but these compositions are almost completely water insoluble and for that reason the use of these compounds as microbicides has heretofore been restricted. Marova, Voronkov, and Dolgov (Chem. Abst. 51:13302b) have pointed out that the activity of methylene bisthiocyanate as a microbicide is equivalent to that of sodium pentachlorophenate, a well known fungicide. In spite of the teachings of these authors methylene bisthiocyanate has not been widely used as either a microbicide or an insecticide. This is probably true because of the difficulty in providing stable concentrated liquid compositions which can be readily added to industrial process systems and products during the course of manufacture.

It is, therefore, a principal object of the present invention to provide a stable, concentrated liquid composition for the control of microorganisms, fungal growth and other purposes, which obviates the disadvantages of the prior art.

It is another object of the present invention to provide a composition that is easily dispersed in industrial aqueous process systems forming an effective concentration therein.

It is still another object of this invention to provide a composition for the control of microorganisms in industrial process systems containing cellulosic, proteinaceous, and other biodegradable materials.

These and other objects and advantages of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

In brief, the foregoing objects and advantages are attained by means of a composition comprising methylene bisthiocyanate, a dispersant, and at least one dimethylamide. More specifically, the foregoing objects and advantages are accomplished by adding the composition of our invention to an industrial system, whereby the growth of fungi and bacteria are inhibited. As to the amount of the composition to be added to the industrial system, suitable and preferred quantities are such so as to give a concentration varying from 0.1 to 500 and 0.3 to 150 parts respectively of methylene bisthiocyanate per million parts of water.

Stated broadly, the composition of our invention is useful for:

(1) Treatment of fresh water to prevent the growth of fungi and bacteria.

(2) Inhibiting fungal growth on wet pulp containing more than 30 percent water.

(3) Inhibiting fungal growth on "nodular" or dewatered pulp.

(4) Slime control in pulp and paper mills, and sugar cane grinding mills.

(5) Protecting paper machine wet felts from microorganism attack.

(6) Preservation of coatings, surface sizes, and alum.

(7) Manufacture of fungal resistant paper and paper board.

(8) Treatment of hides, fat liquors, finishes and leather to prevent damage by fungi and bacteria.

(9) Control of sulfate-reducing bacteria in petroleum secondary operations.

(10) Preservation of pulpwood and wood chips, and unseasoned wood products during seasoning and storage.

It would be expected that methylene bisthiocyanate could be easily dispersed in water especially if any of the conventional methods of facilitating the preparation of such dispersions were used. We found, however, that this was not true. In an attempt to prepare a dispersion a mixture comprising methylene bisthiocyanate, water, and a dispersant was vigorously agitated but the results were unsatisfactory. Furthermore, alkaline dispersants could not be used at all because these dispersants decompose methylene bisthiocyanate. Cationic dispersants were ineffective or decomposed methylene bisthiocyanate, while most of the nonionic dispersants were ineffective.

In another series of experiments, methylene bisthiocyanate was dissolved in water insoluble and water soluble organic solvents with and without a dispersant. The solutions as prepared were added to water and the resulting mixture was vigorously agitated. Again the results were unsatisfactory. In those experiments in which a water insoluble solvent was used, the system separated into two liquid phases very rapidly when the agitation of the mixture ceased. Most of the methylene bisthiocyanate was found in the organic layer. When a solution of methylene bisthiocyanate in a water-soluble solvent was added to water, the methylene bisthiocyanate immediately precipitated and could be redissolved only with difficulty. This was true even though the resulting concentration was less than the solubility of methylene bisthiocyanate in water. No beneficial results were obtained when a dispersant was incorporated in the mixtures.

In summation, we have found that one cannot prepare a dispersion of methylene bisthiocyanate in water of a relatively high concentration using conventional methods of preparing a dispersion. This is a disadvantage and the desirability of preparing a dispersion containing a high concentration of methylene bisthiocyanate will be apparent to those skilled in the art. For example, in the treatment of partially dewatered pulp to inhibit fungal growth it is important to add only the minimum quantity of water. We have now discovered that using the compositions of our invention, dispersions containing methylene bisthiocyanate of the desired concentration can be prepared, which will be described in detail.

Before proceeding with specific examples illustrating our invention, it may be well to indicate in general the nature of the materials required.

Methylene bisthiocyanate, $CH_2(SCN)_2$, may be prepared by reacting methylene bromide or iodide with an alkali metal or ammonium thiocyanate. Since this reaction has been described in the chemical literature, it will not be described here.

Suitable dimethylamides for use in our invention have the formula:

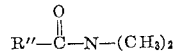

where R″ is hydrogen, saturated, unsaturated, or hydroxy substituted alkyl radicals containing from 1 to 22 carbon atoms. They are prepared from saturated and unsaturated carboxylic acids including hydroxy acids containing from 1 to 22 carbon atoms. Methods of preparing such amides are described in the chemical literature and for that reason will not be discussed further. Preferred acids because of cost and availability include formic, acetic, propionic and mixtures of acids such as found in tall, castor, corn, cottonseed, linseed, olive, peanut, rapeseed, safflower, sesame, and soybean oils. A mixture of carboxylic acids particularly suitable for use in our invention is that available commercially as tall oil fatty acids under the trademark Unitol ACD. A typical analysis of this product is as follows:

TABLE 1

| | Specification range | Typical analysis |
|---|---|---|
| Fatty acids, pct | 98.8–99.7 | 98.9 |
| Rosin acids, pct | 0.2–0.6 | 0.5 |
| Unsaponifiables, pct | 0.1–0.6 | 0.6 |
| Linoleic acid, pct | | 45 |
| Oleic acid, pct | | 51 |
| Saturated acid, pct | 2.0–2.8 | 2.4 |
| Acid number | 198–201 | 199 |
| Saponification number | 198–202 | 200 |
| Color, Gardner | 3––4– | 3+ |
| Viscosity: | | |
| SSU, 100° F | | 105 |
| Gardner seconds | | 0.9 |
| Specific gravity, 60° F./60° F | | 0.905 |
| Titre, ° C | –1–1.0 | 0.0 |
| Flash point, ° F | | 375 |
| Fire point, ° F | | 435 |

Suitable dispersants for use in our invention are classified as nonionic. More specifically, these dispersants are prepared by reacting alkylene oxide with an alkyl phenol or a hydrophobic alcohol. Somewhat more specifically, the dispersants are those prepared from alkyl phenols, wherein the alkyl group contains from 6 to 20 carbon atoms and alkylene oxide such as ethylene and propylene oxides. The amount of alkylene oxide reacted varies from about 1 to 20 moles per mole of the alkyl phenol or hydrophobic alcohol. Dispersants so prepared have the formula:

$$R-O-(R'C_2H_3-O)_xH$$

where $x$ is an integer varying from 1 to 20, R is a straight or branched chain alkyl-substituted benzene or a straight or branched chain alkyl radical with the alkyl radical containing from 6 to 20 carbon atoms, and R′ is hydrogen or methyl. Chemically, these dispersants are known as alkyl phenyl polyalkylene glycol ethers when the compound is prepared from an alkyl phenol and as a polyakyene gycol ether when the compound is prepared from a hydrophobic acohol and alkylene oxide. The method used in preparing the alkyl phenol ethylene oxide condensation products is described in British Patent 470,181 dated August 3, 1937. Specific examples of the alkyl phenols include: 4-methl-2-tert-octylphenol, 1,1,3,3,-tetramethylbutylphenol, nonylphenol and dodecylphenol.

Suitable and preferred quantities of each of the components making up the microbicidal composition in weight percent of this invention vary as follows:

| | Suitable | Preferred |
|---|---|---|
| Methylene bisthiocyanate | 5–50 | 20–40 |
| Dispersant | 5–40 | 10–20 |
| Dimethylamide | 10–90 | 45–65 |

In order to disclose the nature of the invention still more clearly, the following illustrative examples will be given. It is understood, however, that the invention is not to be limited to the specific conditions or details set forth in these examples, except insofar as such limitations are specified in the appended claims.

*Example 1*

The effect of a composition containing 27 percent of methylene bisthiocyanate, 53 percent of dimethylacetamide, 7.0 percent of dimethylamides of tall oil fatty acids (Unitol ACD), and 13.0 percent of a dispersant prepared by reacting 1 mole of dodecylphenol with 9 moles of ethylene oxide on the three fungi, *Aspergillus niger*, *Penicillium roqueforti*, and *Chaetomium globosum* was determined in this example. A variation of the pulp-substrate method disclosed in U.S. Patent 2,881,070 was utilized for these tests.

The pulp-substrate test method, which can be employed with various test microorganisms, simulates the conditions prevailing during actual papermaking operations, that is, those existing in a simple furnish for papermaking.

When fungi are used as test organisms, the pulp-substrate test method is modified to permit the growth of these microorganisms. The pulp substrate comprises an aqueous slurry of spruce groundwood containing 1 percent by weight (dry basis) of wood fibers and it is enriched by the addition of 0.26 percent of sodium nitrate and 0.64 percent of maltose (technical grade). Forty-gram portions of the enriched groundwood pulp slurry were added to 250 ml. Pyrex Erlenmeyer flasks fitted with loose metal caps and then sterilizd. Each of the following substances was then added to the flasks in the order listed:

(1) Sterile distilled or sterile demineralized water as required in each individual case to bring the total weight of the contents of each flask to 50 grams, after allowing for all subsequent additions specified hereinafter (including inoculation with the aqueous suspension of spores and/or mycelial fragments of the test fungus).

(2) One milliliter of a 2.0 percent by weight sterile solution of rosin size. Rosin size is the pasty sodium soap of rosin containing approximately 20 to 30 percent free rosin and 30 percent water. A suitable rosin size is that known as rosin size 70D made by Papermakers' Chemical Department, Hercules Powder Co., Kalamazoo, Michigan.

(3) Solution of toxicant or control agent to be evaluated in each test, to give the concentration desired in parts per million by weight.

(4) Sterile solution of buffer salts to adjust the substrate to a pH of 4.5 to 5.0, prepared from 0.2 M solutions of potassium acid phthalate and sodium hydroxide.

(5) Inoculum consisting of 1 milliliter of an aqueous suspension of spores and/or mycelial fragments of the test organism. *Aspergillus niger, Chaetomium globosum, Penicillium roqueforti* are test fungi which were used for these tests.

The buffer mixtures were prepared following the procedure disclosed in U.S. Patent 2,881,070.

After the inoculant suspensions of the test fungi had been added, the flasks were allowed to incubate at a temperature of 30±1° C. for a period adequate for growth in the controls (those portions of pulp substrate which contained no toxicant). Growth was recorded after 14 days incubation on the basis of the following key:

4=excellent
3=good
2=poor
1=very poor, scant, questionable
0=no growth

The results are summarized in Table 2.

TABLE 2.—INHIBITION OF *ASPERGILLUS NIGER*, *PENICILLIUM ROQUEFORTI* AND *CHAETOMIUM GLOBOSUM* BY THE COMPOSITION DESCRIBED IN EXAMPLE 1 IN A PULP-SUBSTRATE METHOD AFTER 14 DAYS INCUBATION

| Test organism | Concentration, parts per million | Rate of growth |
| --- | --- | --- |
| *Aspergillus niger* | 50 | 0 |
|  | 100 | 0 |
|  | 150 | 0 |
|  | 200 | 0 |
| *Penicillium roqueforti* | 50 | 0 |
|  | 100 | 0 |
|  | 150 | 0 |
|  | 200 | 0 |
| *Chaetomium globosum* | 50 | 0 |
|  | 100 | 0 |
|  | 150 | 0 |
|  | 200 | 0 |

*Example 2*

This example is concerned with a lap pulp preservation test which simulates the conditions prevailing during the storage of moist groundwood lap pulp stock in pulp and paper mills.

The lap pulp preservation tests were conducted upon a pulp substrate consisting of specimens of spruce lap pulp which weighed 2.5±0.1 gram each on an oven-dry basis and measured approximately 6 cm. x 6 cm. Each test specimen was placed into a sterilized glass Petri dish and the following sequence of operations performed in duplicate for various concentrations of the composition described in Example 1.

(1) A suitable amount of mineral salts was introduced into each test specimen of oven-dry lap pulp by uniformly distributing 2.0 ml. of the following solution over the test specimen:

|  | Grams |
| --- | --- |
| Ammonium nitrate | 3.0 |
| Dipotassium phosphate | 1.0 |
| Potassium chloride | 0.25 |
| Magnesium sulfate | 0.25 |
| Polyoxyethylene derivative of sorbitan monooleate | 0.5 |
| Demineralized water, 1000 ml. | |

After the test specimens were uniformly wetted, the entire series of specimens was dried in an oven at 105° C. for one hour. The Petri dish covers were left partially open to facilitate drying.

(2) Two milliliters of the composition of Example 1 dissolved in water so as to provide the desired concentration in the test specimen was then added to duplicate specimens. Untreated control specimens were prepared in quadruplicate by adding 2.0 ml. of sterile water instead of the aqueous solution of the composition being tested.

(3) The final addition to each test specimen was that of the inoculum, which contained 0.5 gram (0.5 ml.) of water to complete the total weight desired for the test specimen, namely 5.0±0.1 grams. The pulp specimens thus contained 50 percent water and 50 percent pulp. The inoculum was prepared in one of two manners, depending upon the test organism. With the fungi *Aspergillus niger, Chaetomium globosum, Penicillium chrysogenum* and *Pullularia pullulans*, suitable spore suspensions were readily obtained from mycophil or malt agar tube slants which were added carefully to the upper side of the prepared test specimens of lap pulp. With the wood-rotting fungus, *Lenzites saepiaria*, spore suspensions were not feasible and this organism was cultured on mycophil or malt agar plates until most of the surface was covered with cycelial growth. Small lap pulp squares, measuring approximately 0.6 cm. x 0.6 cm. and containing the mineral salts and detergent described in 1 were placed on the surface of the mycelial mat. After visible growth occurred on these small squares of pulp, they were transferred aseptically to small pockets made in one end of each lap pulp specimen. A small amount of sterile water (0.2 ml.) was added to the upper side of each pocket with inoculum to complete the operation.

(4) A tight-fitting wide rubber band was then placed over each Petri dish with its inoculated lap pulp specimen to minimize the loss of moisture from the specimen during incubation. The temperature of incubation was 28° to 30° C.

(5) Observations of the test specimens were started after 1 week and continued weekly until the end of the fourth week.

At the end of the four week period, 75 p.p.m. of the test composition described in Example 1 was sufficient to inhibit the growth of the *Aspergillus niger* and *Chaetomium globosum*. Thirty parts per million inhibited the growth of *Pullularia pullans* and *Penicillium chrysogenum* and 300 p.p.m. inhibited the growth of the *Lenzites saepiaria*.

*Example 3*

The composition described in Example 1 was tested by the pulp-substrate method described in U.S. Patent 2,881,070, using *Aerobacter aerogenes* and pulp substrates that were buffered to pH values of 5.5, 6.5 and 7.5, respectively. The results are tabulated in Table 3.

TABLE 3.—PERCENTAGE KILL OF *AEROBACTER AEROGENES* IN A PULP SUBSTRATE AT PH 5.5, 6.5, AND 7. AFTER 18 HR. CONTACT WITH THE COMPOSITION DESCRIBED IN EXAMPLE 1.

| Concentration, Parts per million | pH | Kill, Percent | pH | Kill, Percent | pH | Kill, Percent |
|---|---|---|---|---|---|---|
| 0.1 | 5.5 | 30 | 6.5 | 0 | 7.5 | 28 |
| 0.3 | | 64 | | 99.0 | | 93 |
| 0.5 | | 97 | | 99.5 | | 99.2 |
| 0.7 | | 99.99 | | 99.6 | | 99.6 |
| 1.0 | | 99.99 | | 99.99 | | 99.8 |
| 2.0 | | 99.99 | | 99.99 | | 99.99 |
| 4.0 | | 99.99 | | 99.99 | | 99.99 |
| 6.0 | | 99.99 | | 99.99 | | 99.99 |

In the foregoing detailed description, it will be apparent that many variations may be made without departing from the spirit and scope of the invention. Thus, for example, any of the dispersants and/or the dimethylamides disclosed may be substituted for those used in the specific examples and also the relative amounts of the three components making up the composition may be varied within the limits specified without altering the effectiveness of the final composition. Many other variations will be apparent to those skilled in the art. We, therefore, intend to be limited only in accordance with the following claims.

We claim:
1. A water-dispersible microbicidal composition of matter comprising methylene bisthiocyanate, a dispersant having the formula

wherein $x$ is an integer varying from 1 to 20, R is selected from the group consisting of straight and branched chain alkyl substituted benzenes and straight and branched chain alkyl radicals containing from 6 to 20 carbon atoms and R' is selected from the group consisting of hydrogen and methyl, and a dimethylamide having the formula

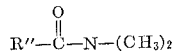

wherein R'' is selected from the group consisting of hydrogen, saturated, unsaturated, and hydroxy substituted alkyl radicals containing from 1 to 22 carbon atoms characterized in that the methylene bisthiocyanate content varies from 5 to 50, that of the dispersant varies from 5 to 40, and that of the dimethyl amide varies from 10 to 90, all in percent by weight of the composition.

2. The composition of claim 1, wherein the dispersant used was formed by reacting ethylene oxide with dodecylphenol on a molar basis of 9 moles of ethylene oxide per mole of dodecylphenol.

3. A method of inhibiting the growth and proliferation of microorganisms in fresh water, which comprises adding to said fresh water the composition defined in claim 1 in an amount sufficient to provide a concentration of the methylene bisthiocyanate of from 0.1 to 500 parts per million parts of water.

4. A method of inhibiting fungal growth on an organic substance which is susceptible to said growth in the presence of moisture, which comprises adding to said organic substance the composition defined in claim 1 in an amount sufficient to provide a concentration of the methylene bisthiocyanate of from 0.1 to 500 parts per million parts of water.

5. A method of inhibiting microbiological deterioration of an organic cellulosic substance that is susceptible to deterioration by the action of microorganisms and inhibiting the formation of slime in aqueous fluids that are in contact with such substance, which comprises adding to said aqueous fluids the composition defined in claim 1 in an amount sufficient to provide a concentration of the methylene bisthiocyanate of from 0.1 to 500 parts per million parts of water.

6. A method of controlling the growth and proliferation of sulfate-reducing bacteria as well as species of slime-forming microorganisms in secondary petroleum operations, which comprises adding to the water in such systems the composition defined in claim 1 in an amount sufficient to provide a concentration of the methylene bisthiocyanate of from 0.1 to 500 parts per million parts of water.

7. A method of inhibiting the microbiological deterioration of a cellulosic material that is susceptible to deterioration by the action of microorganisms in the presence of moisture, which comprises adding to said cellulosic material the composition of claim 1 in an amount sufficient to provide a concentration of the methylene bisthiocyanate of from 0.1 to 500 parts per million parts of water.

8. A method of inhibiting the microbiological deterioration of an organic material used in the manufacture of leather that is susceptible to microbiological deterioration in the presence of moisture, which comprises adding to said organic material the composition of claim 1 in an amount sufficient to provide a concentration of the methylene bisthiocyanate of from 0.1 to 500 parts per million parts of water.

References Cited by the Examiner

UNITED STATES PATENTS

| | | | |
|---|---|---|---|
| 2,130,530 | 9/1938 | Fletcher | 162—161 X |
| 3,151,018 | 9/1964 | Girard | 162—161 |
| 3,170,942 | 2/1965 | Fancher et al. | 167—22 |
| 3,212,963 | 10/1965 | Wehner | 162—161 X |
| 3,252,855 | 5/1966 | Wehner | 167—22 |

FOREIGN PATENTS 545,740  3/1932  Germany.

OTHER REFERENCES

McGraw-Hill, "Pulp and Paper Manufacture," volume 4, 1955, McGraw-Hill Book Co., New York, page 600.

DONALL H. SYLVESTER, *Primary Examiner.*

S. LEON BASHORE, *Assistant Examiner.*